United States Patent
Morse

[11] 3,971,510
[45] July 27, 1976

[54] CENTRIFUGAL SEPARATOR

[76] Inventor: Theodore Frederick Morse, 25 Taber Ave., Providence, R.I. 02906

[22] Filed: June 9, 1972

[21] Appl. No.: 261,449

Related U.S. Application Data

[63] Continuation-in-part of Ser. No. 126,104, March 19, 1971.

[52] U.S. Cl. .................................. 233/27; 233/16; 233/DIG. 1
[51] Int. Cl.² ......................................... B04B 1/00
[58] Field of Search.................. 233/DIG. 1, 18, 27, 233/13, 31, 37, 43

[56]  References Cited
UNITED STATES PATENTS

| | | | |
|---|---|---|---|
| 2,459,145 | 1/1949 | Boestad | 233/18 |
| 3,289,925 | 12/1966 | Zippe et al. | 233/1 |
| 3,332,614 | 7/1967 | Webster et al. | 233/13 |

*Primary Examiner*—Stephen J. Lechert, Jr.
*Attorney, Agent, or Firm*—Barlow & Barlow

[57] ABSTRACT

The invention is an improved form of an ultracentrifuge used in the separation of gases, particularly those of high molecular weight. Through the introduction of an inner cylinder within the outer cylinder of a high speed centrifuge, a higher over-all flow profile efficiency is created. In addition, although a gain of lesser significance, the vacuum core present in ultra centrifuges, which does not contribute to the separative power of the centrifuge, is virtually eliminated. Moreover, for those gases in which the maximum pressure in the centrifuge is limited by a phase change, i.e. the maximum pressure in the centrifuge must be kept below the vapor pressure, the addition of the inner cylinder raises the pressure in the central core region by several orders of magnitude, which permits the subsequent reduction of pressure on the outer walls of both inner and outer cylinders without any portion of the centrifuge being in the Knudsen regime. With this reduction of pressure on the outer walls, the gas can then be centrifuged at a lower temperature, thus further increasing the productive capacity of such a device.

3 Claims, 6 Drawing Figures

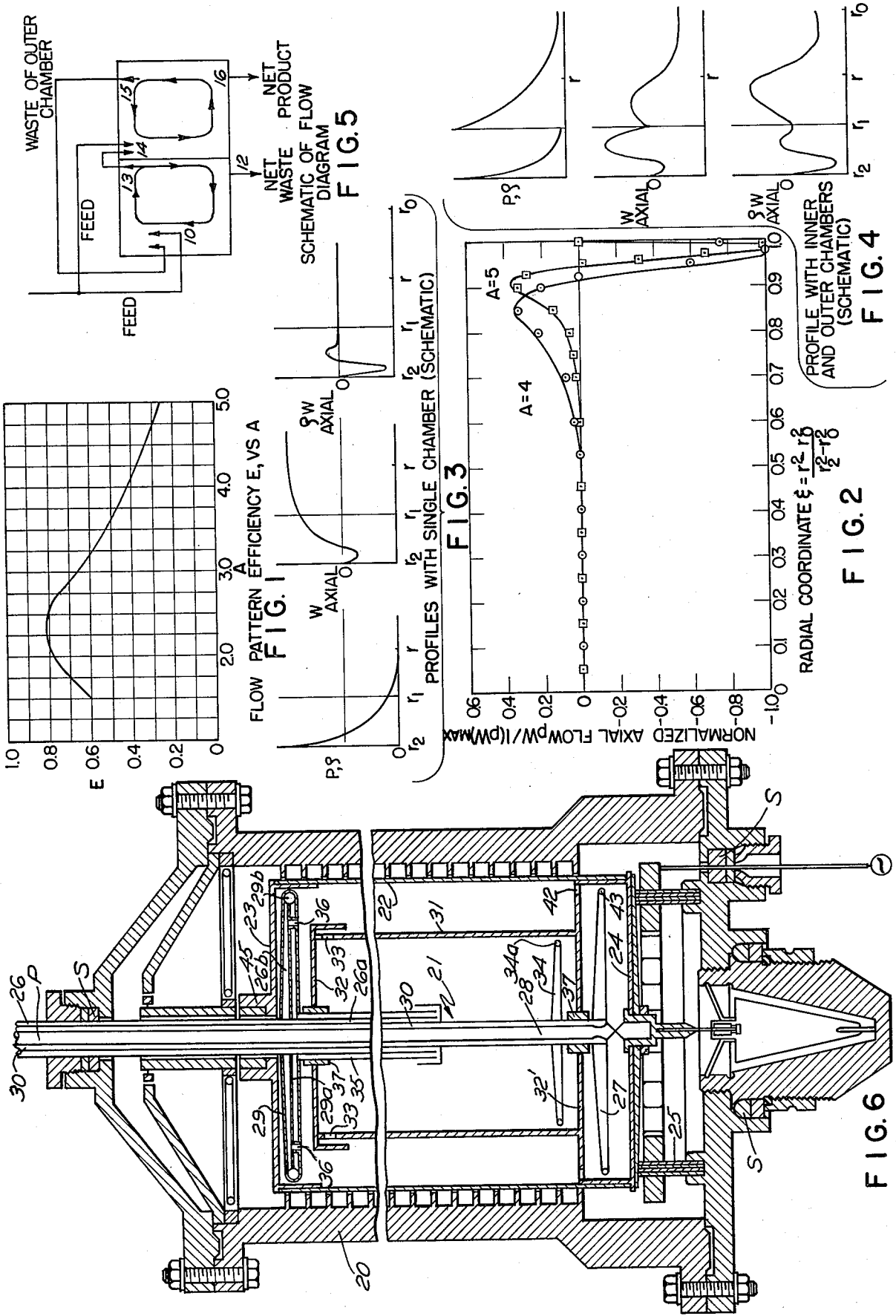

CENTRIFUGAL SEPARATOR

CROSS REFERENCE TO RELATED APPLICATION

This application is a continuation-in-part of my application Ser. No. 126,104, filed Mar. 19, 1971.

BACKGROUND OF THE INVENTION

The prior art for such gas centrifuges is typified in German Pat. No. 1,071,593 and U.S. Pat. No. 3,289,925. The basic concept consists of a thin walled cylindrical shell, with enclosed top and bottom, that rotates at high speed. It is the centrifugal force and associated counter current flow pattern of the secondary rotary motion (thermally or mechanically induced) that provides the effective field for the separation of gas mixtures. The thin shell is driven as the rotor of an induction motor, which has the advantage that no mechanical torque must be transmitted to the rotor by external means. To allow continuous flow of the enriched and stripped gas the axis is a stationary arrangement of concentric tubing. This inner axis thus provides a means by which the unseparated gas can be introduced into the rapidly rotating central portion, also it is the means by which the components of the heavier and lighter gas may be removed. Attached to the stationary inner axis is a stationary stagnation arm extending across the top of the inner portion of the rotating cylinder. The purpose of this arm is to stimulate the necessary secondary flow in the device, which has a counter-current pattern, and to serve as a duct for the removal of the heavier component of the separated gas. The lower surface of the centrifuge rotates, and there are ports in this lower surface that permits the exit of the lighter gas, which is then picked up by a stationary ducting arm that leads back along the axis to the top of the device. The inner cylinder is attached to the stationary axis by suitable rotating seals, that, at high enough rim speeds, almost become superfluous due to the absence of gas in the inner region. The housing of the centrifuge is stationary, and can be constructed, as in the above mentioned German and United States patents, so that the rotation of the cylindrical shell serves to pump out any exhaust gas that may have diffused into the electric drive section of the device. The detailed balancing and adaptations for stability are standard, and some are described in the above mentioned German and United States patents.

An important drawback associated with previous ultracentrifuges is the marked decrease in flow profile efficiency with increasing rim velocity. Moreover, the vacuum core region increases with increasing rim velocity, and this region makes no contribution to separative power. It is the purpose of the present invention to solve, in part, these problems, and in such a manner that the device will be extremely simple, low cost, and easy to mass produce.

SUMMARY OF THE INVENTION

It is the aim of the present ultracentrifuge invention to do three things through the addition of an inner wall. First, the inner wall will increase the overall flow profile efficiency of the device, secondly, the inner wall, with the choked ports connecting the inner and outer regions, will eliminate the vacuum core, and third, the elimination of the vacuum core will allow gas pressures to be decreased without any part of the machine going into the Knudsen regime, which will then allow a subsequent cooling of the gas and the accompanying increase in the productive power output of the device. These objectives are achieved by placing a thin walled inner cylinder within the centrifuge with a counter current flow established within the inner cylinder as well as within the outer annulus. Several arrangements of ducting are possible; ducts may carry the product and waste from the inner and outer chambers separately to the next stage in the centrifugation process, or, perhaps of greatest interest, the waste from the outer chamber can be fed into the inner, and the product from the inner chamber can be fed into the outer chamber. Thus, the inner centrifuge would function as a stripper, and the outer centrifuge would function as an enricher. Stationary stagnation arms must be so arranged to drive the flow, as well as remove it, and, most important, the ports connecting the inner cylinder to the outer annulus, (at the outer edge of the inner cylinder) must be aerodynamically choked so that a pressure jump can exist between the inner and outer regions.

DESCRIPTION OF THE DRAWINGS

FIG. 1 is a graph showing flow pattern efficiency as a function of A;

FIG. 2 is a graph showing axial flow velocity multiplied by density for several values of A;

FIG. 3 are graphical profiles of pressure-density, axial velocity, and axial velocity multiplied by density as a function of radius for single chambered centrifuge;

FIG. 4 are similar profiles to FIG. 3 but for a two chambered centrifuge;

FIG. 5 is a diagram of one possible flow arrangement for connecting inner and outer regions; and FIG. 6 is a cross sectional view, partly diagrammatic illustrating the invention.

DESCRIPTION OF THE PREFERRED EMBODIMENT

In the specification the following symbols are used:

$\delta U_{max}$ ~ theoretical separative power
$Z$ ~ length of centrifuge
$\rho$ ~ Density
$D$ ~ diffusion coefficient
$\Delta M = M_1 - M_2$ ~ Molecular weight difference
$M_1, M_2$ ~ molecular weights
$r$ ~ position variable
$r_o$ ~ radius of inner central axis
$r_1$ ~ outer radius of inner cylinder
$r_2$ ~ outer radius of centrifuge
$\omega$ ~ angular velocity
$\Theta$ ~ % of flow in the gas product stream (cut)
$p$ 18 pressure
$T$ ~ temperature
$L_o, L, F$ ~ reference flows, see text, eq. 4, 5 & 6
$E$ ~ flow pattern, or profile efficiency
$A$ = ratio of outer rim velocity to thermal speed
$W$ = axial velocity
$R$ ~ universal gas constant Consider the long bowl ultracentrifuge, where the theoretical separative power is given, in standard notation, as $$\delta U_{max} = (\pi Z/2) \rho D \left[ \frac{\Delta M \omega^2 r_2^2}{2RT} \right]^2 \frac{m^2}{1+m^2} E \qquad (1)$$

where $$E = \frac{4}{r_2^4} \frac{[\int_0^{r_2} r\, dr \int_0^r p\, W\, r\, dr]^2}{\int_0^{r_2} \frac{dr}{r} (\int_0^r p\, W\, r\, dr)^2} \quad (2)$$

is the flow pattern efficiency, and the parameters $m$, $L_o$ and $F$ are defined as follows:

$$m = \frac{L}{L_o} \quad (3)$$
$$L_o = 4\sqrt{2}\, \pi\, \rho\, D\, r_2\, F \quad (4)$$
$$L = \frac{2\pi}{RT} \int_0^{r_2} |p\, W|\, r\, dr \quad (5)$$

and $$F = \frac{1/4 \int_0^{r_2} |p\, W|\, r\, dr}{[\int_0^{r_2} \frac{dr}{r} (\int_0^r p\, W\, r\, dr)^2]^{1/2}} \quad (6)$$

Another important parameter is the ratio of the outer rim velocity to the thermal speed.

$$A = \frac{\omega\, r_2}{\sqrt{\frac{2RT}{M}}} \quad (7)$$

Typical values of interest are $4 \leq A \leq 5$. The parameter $m$ is often adjusted so that $m^2/(m^2 + 1)$ is quite close to 1, and the parameter E then determines the productive power for a given A. FIG. 1 is a theoretical result from University of Virginia Report EP-4422-279-36U, January 1963, by Parker & Mayo, showing the flow pattern efficiency as a function of A. Note that for $A = 5$, $E = 28\%$, and that for $A = 4$, $E = 42\%$. This curve does not include any vacuum core losses which would tend to depress even further the efficiency for $A = 5$ as compared with the efficiency for $A = 4$. The important component of the efficiency is the integral of the axial velocity multiplied by the pressure. Now, to lowerst order, the pressure decreases exponentially from the outer rim to the inner core, and no contribution to separative power is made in regions in which $$p\, W \approx 0 \quad (8)$$

is approximately zero. For several values of A, the axial flow velocity multiplied by density, and suitably normalized is shown in FIG. 2 taken from Flow Research Laboratory Report "A Simplified Model for the Axial Flow in a Long Countercurrent Gas Centrifuge" of Jan. 25, 1963, by Berman. In FIG. 3 are shown the pressure, or density profiles (temperature will have but a secondary effect), the axial velocity and the axial velocity multiplied by the density (or pressure) all as a function of the radial position for the single chambered device. Note that the centrifuge does not contribute to separative power inside the radius $r_1$, where the product $pw$ becomes negligibly small. Consider now a second centrifuge within the first, such that the wall is placed at $r_1$. The efficiency of the outer centrifuge, now operating between $r_1$ and $r_2$ will be essentially unchanged by the addition of this inner cylinder. Consider now the pressure, density, axial velocity, and axial velocity multiplied by pressure profiles for the inner plus the outer centrifuges. These are shown in FIG. 4. Note that the density is so arranged such that there is a large $r_{jump}$ across the inner cylinder, and there will be a velocity slip at the outer wall of the inner cylinder as shown (due to low density effects). The important thing to note, however, is that the flow profile efficiency of the outer cylinder will be unchanged as long as the inner wall is placed in a region where the product $pW$ may be neglected. For $A=5$, the product of pressure and axial flow is negligibly small at $h_1 r_2 = 0.8$. (See FIG. 2.) This corresponds to an outer efficiency of 0.28, from FIG. 2. The inner flow profile efficiency is 42%, but the rim velocity for the inner centrifuge is only 80% of the outer rim velocity. Therefore, from equation 1, the ideal separative power (for $m^2/(m^2 + 1) \approx 1$) for the outer centrifuge is given as follows:

$$\left. \frac{\delta U_{max}}{\pi Z/2\, \rho D \left[\frac{\Delta M \omega^2 r_2^2}{2RT}\right]^2} \right|_{outer} = 0.28 \quad (9)$$

For the inner centrifuge, the ideal separative power is $$\left. \frac{\delta U_{max}}{\pi Z/2\, \rho D \left[\frac{\Delta M \omega^2 r_2^2}{2RT}\right]^2} \right|_{inner} = \left(\frac{r_1}{r_2}\right) 0.42 = .172 \quad (10)$$

where this is an appreciable fraction of the centrifuge productive power with no internal wall.

There are numerous possible arrangements by which one might combine two such flow patterns, but the essential point is simplicity of construction and ease of mass production.

In FIG. 5, a schematic flow diagram is presented, by which flow between the inner and outer centrifuges is maintained. The inner centrifuge is used as a stripper and the outer centrifuge is used as an enricher. Feed comes into the inner region at point 10, and waste, or heavier product leaves at point 12. The waste from the outer centrifuge leaves at point 15, and is mixed with the feed stream and fed into the inner centrifuge at point 10. The net product of the device leaves at point 16. The product of the inner centrifuge leaves at point 13 through a choked port and enters the outer centrifuge at point 14 to mix with the feed stream for the outer centrifuge. The incoming feed is split between the inner and outer centrifuges, and the variables that may be changed for optimum performance are the cut of the inner centrifuge, the cut of the outer centrifuge, and the ratio of the inner feed to the outer feed where the cut is the percentage flow of product gas. The exit port 13 may be easily sized so that it is choked. This guarantees the isolation in pressure of the outer and the inner chambers, and eliminates the vacuum core problem, as well as increasing the overall flow pattern efficiency for the device. Furthermore, pressures at the outer wall of the outer centrifuge and the outer wall of the inner centrifuge can be decreased without more of the machine going into the Knudsen regime. This decrease in pressure would allow further cooling of the gas before any limitation imposed by phase transitions might be reached, and cooling the gas would further increase the ideal productive output of the centrifuge. It is estimated that for present technology, a cooling of the order of 15°–20°C might be attained. It should also be noted that for a subcritical device, it would be necessary to shorten the inner cylinder to guarantee that this inner cylinder also remained below the first eigenfrequency. For the same angular rotation, the following relation must hold if the inner cylinder is also to be subcritical $$\frac{r_1}{Z_1^2} = \frac{r_2}{Z_2^2} \qquad (11)$$

where $Z_1$ and $Z_2$ are the lengths respectively, of the inner and outer cylinders. Therefore, for $r_1/r_2 = 0.8$, the length of the inner cylinder is 89% of the length of the outer cylinder, if both cylinders are to operate the same amount below the first eigen-freqeuncy. This is incorporated into the design of the centrifuge so that the length of the outer cylinder must not be shortened to accommodate the lower first eigen-frequency of the thinner inner cylinder. As seen in FIG. 6, the inner cylinder will be somewhat shorter than the outer cylinder.

The above arrangement also has the following advantage, that the cut of the inner and outer centrifuges can be varied independently of the total cut, and by varying the feed ratio of the inner to the outer cylinder the total cut can still be maintained near one half. This may be a great simplification in arranging cascades, and further, the output can be increased significantly by varying the cut of inner and outer centrifuges if $E$ is not too strong a function of the cut in the neighborhood of the maximum of $E$.

For a more detailed concept of the total invention, see FIG. 6. As in the development of previous centrifuges, the machine consists of an external cylindrical housing 20, centered about stationary axis members generally designated 21. Seals such as S provide entry of external services to the housing. The thin walled rotating section of the centrifuge has an outer cylindrical shell wall 22, a top wall 23, and two bottom walls 24 and 32'. The bottom wall 24 of the centrifuge serves as the rotor of an induction motor, driven by alternating current from the stator 25. The unseparated gas is introduced into the centrifuge through the stationary annulus 26 of the central axis 21. The lighter component is withdrawn from the region under the lower rotating plate 32' at the bottom of the centrifuge through the hollow stationary arm 27, and passed on to the next stage of centrifugation through the inner cylinder of the central shaft 28. In the single chambered device, heavier gas is withdrawn from the outer rim through the ducting in the upper stationary arm 29, that also serves to stimulate the secondary flow. The gas then passes out through the central axis through the concentric duct 30 of the central shaft.

The present invention consists of the addition, to such an ultra centrifuge, of a thin walled inner cylinder 31 with a top 32 constructed simply of the same metal as the outer cylindrical wall 22, and attached to the bottom 32' of the single chambered device. A choked port 33 carries the product of the inner cylinder to the outer annular region, and a stationary stagnation arm 34 serves to stimulate the secondary flow in the inner region as well as carry off the waste to the next stage of centrifugation through annular duct 30. The choked port 33 guarantees that the pressure along the outside of the inner region will be maintained at a much higher level than the pressure in the inner region of the outer annulus. The vacuum core will be eliminated, and, more important the flow profile efficiency will be higher for the inner region, even though the value of A is lower.

In the present invention, the feed is introduced through the annular duct 26, and mixed with the waste product of the outer centrifuge, that is, taken off from the stagnation arm 29 and fed into the annular duct 35. With the present design, the feed may be split into two streams, one part of which enters into the inner chamber through the annular duct 26a, and one part of which is carried through a second duct 26b in the stationary stagnation arm 29 to be fed into the outer region through port 36. The product that leaves through the choked duct 33 will mix with the feed to the outer annulus, and the waste of the outer annulus will be taken off at point 29b and fed through duct 29a in stagnation arm 29 to annular duct 35 to mix with the feed of the inner chamber. Waste is removed at point 34a and product is removed at point 43, after passing through port 42. The inner centrifuge serves as a stripper, and the outer centrifuge serves as an enricher. Should it be so desired, in the interests of overall efficiency, ducting could be arranged, which would be concentric and stationary, which would keep products and waste of the inner and outer regions separate; however, the additional complexity might not prove this to be worthwhile. The seals at 37 should be simply designed to allow some small leakage, but regions on both sides of these seals will be at low densities, so this is not a critical factor. Similar considerations hold for the seal at 45, which has a magnet imbedded in it to reduce the load on the bottom shaft.

In summary, gas is fed in at duct 26. The stream is then split into duct 26a and 26b. Annular duct 26a feeds the inner chamber along with waste taken from the outer chamber through duct 29a and concentric annular duct 35. The stagnation arm 34 drives the flow in the inner chamber, and waste product is taken off through 34a and fed into the waste duct 30. The product of the inner centrifuge exits through choked port 33 to the outer annulus where it mixes with the feed of the outer annulus that comes through the duct 26b in the upper stagnation arm 29, which serves to drive the secondary flow in the outer chamber. Waste from the outer chamber is removed through duct 29a and fed into annular duct 35 where it mixes with the feed flow to the inner chamber. Product from the outer chamber is removed through the hole 42 in wall 32' (which is not choked) and taken off by the lower removal arm 27 at point 43, and then fed into annular duct 28. There is obviously great flexibility in the choice of cut for inner and outer regions, as well as the ratio of feeds to inner and outer chambers, and location of feed points. Moreover, the overall design is extremely simple.

I claim:

1. An ultracentrifuge having a gas tight cylindrical housing an axis having a hollow axially mounted central shaft with a surrounding stationary annulus and surrounding duct means, a first cylindrical shell having top and bottom walls and mounted about said shaft for rotation about the axis of the housing, means for rotating said shell, a second cylinder mounted within said first shell for rotation therewith, means at the lower end of said first shell for exhausting gas, a stagnation arm mounted adjacent the top wall of the first shell, means for introducing gas into said second cylinder through said annulus, said stagnation arm having a duct therein with a port adjacent the wall of the first shell to carry off waste products, said duct terminating adjacent said annulus in the second cylinder, a second stagnation arm with a duct therein mounted adjacent the bottom wall of the second cylinder to stimulate secondary flow, said duct communicating with the surrounding duct means, a choked duct between said second cylinder and said first cylindrical shell to deliver products of gas from the inner second cyliner cylinder the first cylindrical shell whereby a large pressure differential may be maintained across the second cylinder wall and means at the lower end of said second cylinder for exhausting waste gas.

2. An ultracentrifuge as in claim 1 wherein the means for exhausting gas includes a lower dividing wall extension of the second cylinder bottom wall, an unchoked port in the lower wall adjacent the outer wall of the first cylinder, a hollow stationary arm connected to said central shaft below said lower dividing wall and ports in said arm to allow gas to pass therein and to the central shaft.

3. An ultracentrifuge as in claim 1 wherein said first stagnation arm carries ducting to introduce gas into said first shell, said stagnation arm being coupled to said annulus.

* * * * *